United States Patent
Manole

(10) Patent No.: US 7,159,409 B2
(45) Date of Patent: Jan. 9, 2007

(54) METHOD AND APPARATUS FOR CONTROLLING THE LOAD PLACED ON A COMPRESSOR

(75) Inventor: Dan M Manole, Tecumseh, MI (US)

(73) Assignee: Tecumseh Products Company, Tecumseh, MI (US)

( * ) Notice: Subject to any disclaimer, the term of this patent is extended or adjusted under 35 U.S.C. 154(b) by 316 days.

(21) Appl. No.: 10/790,267

(22) Filed: Mar. 1, 2004

(65) Prior Publication Data

US 2005/0188709 A1    Sep. 1, 2005

(51) Int. Cl.
*F25D 17/00* (2006.01)
*F25D 17/04* (2006.01)

(52) U.S. Cl. .............................. 62/180; 62/186; 62/408
(58) Field of Classification Search .................. 62/180, 62/186, 187, 408, 409, 498
See application file for complete search history.

(56) References Cited

U.S. PATENT DOCUMENTS

| | | | | |
|---|---|---|---|---|
| 3,095,799 A | * | 7/1963 | Pratt ............................ | 454/322 |
| 4,338,791 A | | 7/1982 | Stamp, Jr. et al. ............. | 62/160 |
| 4,667,480 A | * | 5/1987 | Bessler ......................... | 62/180 |
| 4,858,443 A | | 8/1989 | Denpou ........................ | 62/126 |
| 4,920,758 A | | 5/1990 | Janke et al. ................... | 62/187 |
| 4,924,680 A | | 5/1990 | Janke et al. ................... | 62/187 |
| 5,186,237 A | * | 2/1993 | Adasek et al. ................ | 165/42 |
| 5,239,834 A | | 8/1993 | Travers ........................ | 62/151 |
| 5,241,253 A | | 8/1993 | Schlangen ................... | 318/779 |
| 5,381,665 A | | 1/1995 | Tanaka ........................ | 62/197 |
| 5,547,017 A | | 8/1996 | Rudd .......................... | 165/244 |
| 5,582,233 A | | 12/1996 | Noto .......................... | 165/247 |
| 5,678,413 A | | 10/1997 | Jeong et al. ................... | 62/89 |
| 5,678,416 A | | 10/1997 | Yoo et al. ..................... | 62/180 |
| 5,711,159 A | | 1/1998 | Whipple, III .................. | 62/82 |
| 5,778,688 A | | 7/1998 | Park et al. ..................... | 62/89 |
| 5,799,496 A | | 9/1998 | Park et al. ..................... | 62/89 |
| 6,055,820 A | | 5/2000 | Jeong et al. .................. | 62/186 |
| 6,129,056 A | | 10/2000 | Skeel et al. ............... | 123/41.49 |
| 6,138,460 A | | 10/2000 | Lee ............................. | 62/89 |
| 6,286,326 B1 | | 9/2001 | Kopko ........................ | 62/179 |
| 6,405,548 B1 | | 6/2002 | Hollenbeck .................. | 62/186 |
| 6,407,525 B1 | | 6/2002 | Horng et al. | |
| 6,412,292 B1 | | 7/2002 | Spinazzola et al. ............ | 62/89 |
| 6,431,268 B1 | | 8/2002 | Rudd ........................ | 165/223 |
| 6,435,144 B1 | | 8/2002 | Dicke et al. .............. | 123/41.12 |
| 6,453,853 B1 | | 9/2002 | Hawkins et al. ......... | 123/41.12 |

(Continued)

FOREIGN PATENT DOCUMENTS

JP         01289715 A   *   11/1989

*Primary Examiner*—Chen Wen Jiang
(74) *Attorney, Agent, or Firm*—Baker & Daniels LLP

(57) ABSTRACT

A method of operating a vapor compression system, the vapor compression system defining a closed fluid circuit in which a refrigerant is circulated and having operably disposed therein, in serial order, a compressor, a high pressure heat exchanger, an expansion device and a low pressure heat exchanger. The method includes applying a variable thermal load on a first one of the heat exchangers, monitoring the thermal load placed on the first heat exchanger and controlling the operation of the system to limit the thermal load placed on the first heat exchanger when the thermal load exceeds a predetermined value. A heat exchange subsystem employed to limit the thermal load may include reducing the flow of a heat exchange medium over the heat exchanger or to recirculate the heat exchange medium in a manner which reduces the thermal load on the heat exchanger.

26 Claims, 4 Drawing Sheets

U.S. PATENT DOCUMENTS 6,463,891 B1  10/2002  Algrain et al. ........... 123/41.12

6,481,388 B1  11/2002  Yamamoto ............... 123/41.12

* cited by examiner

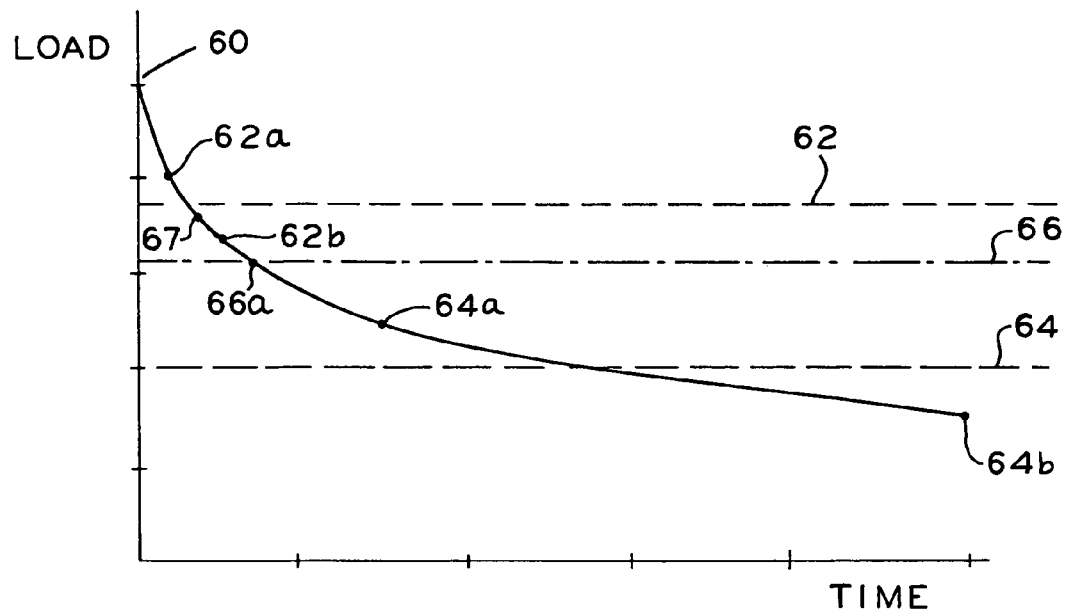
FIG_4
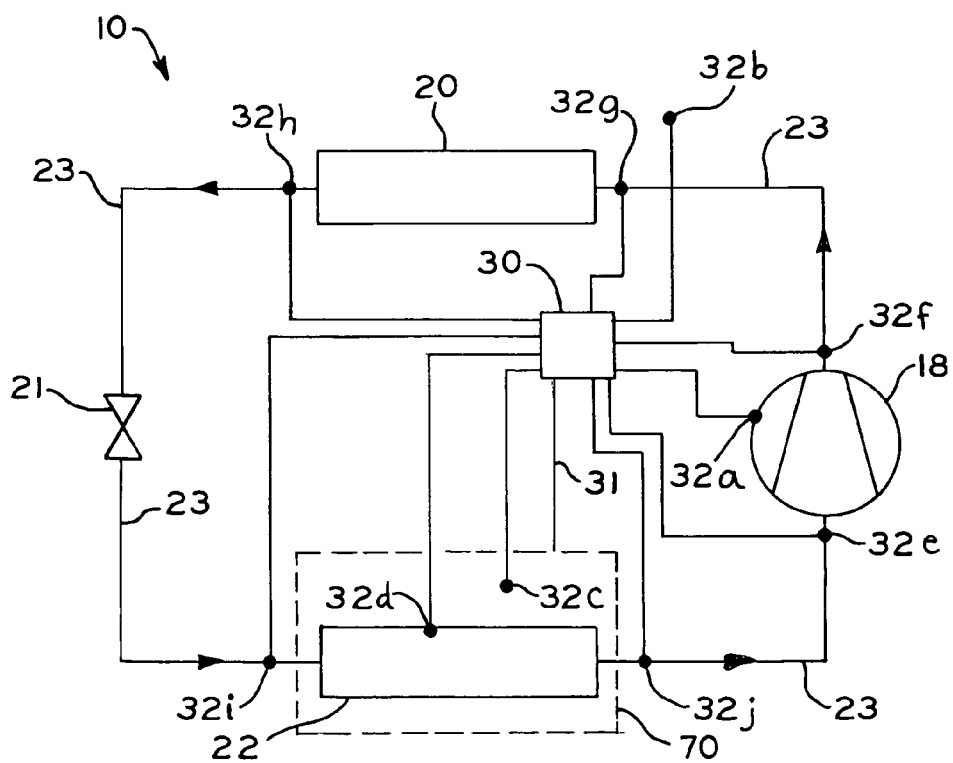
FIG_9

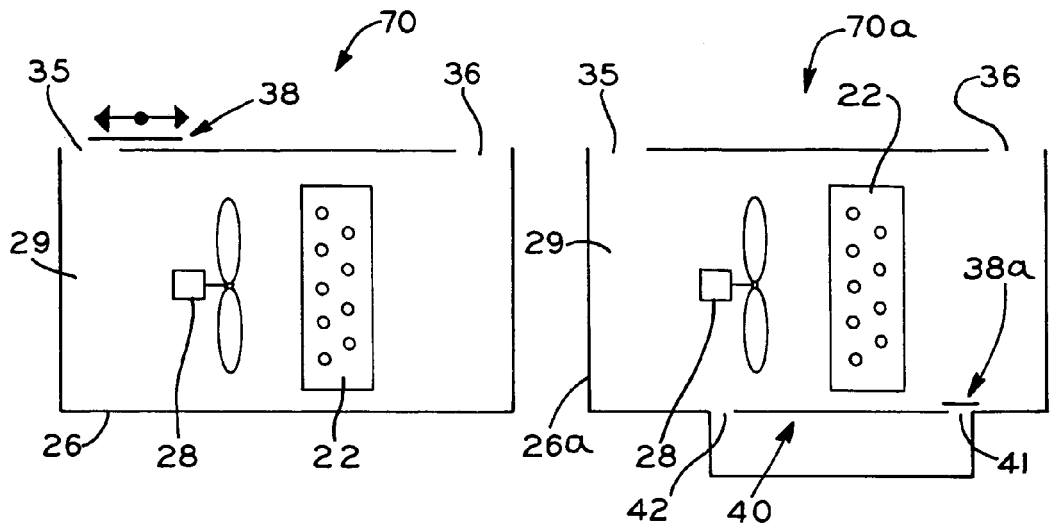
FIG_5    FIG_6
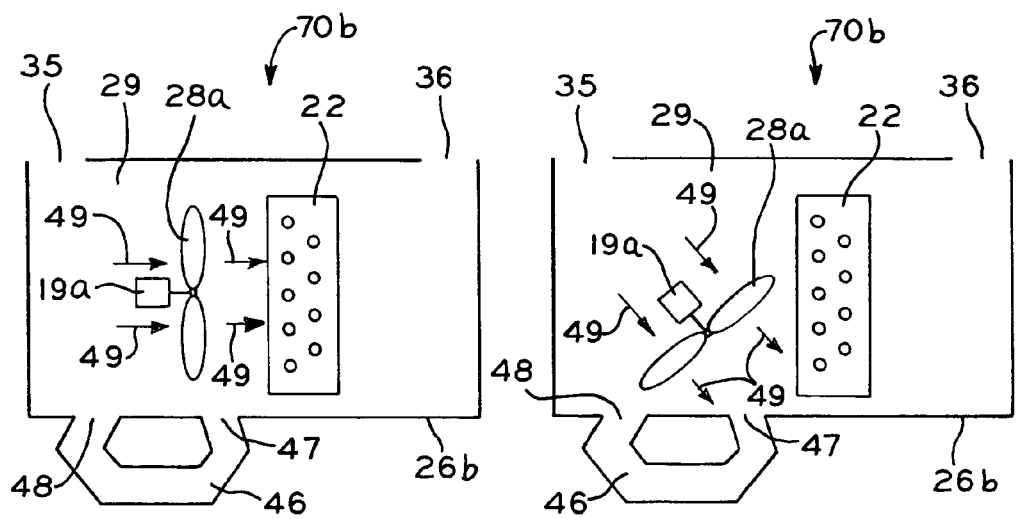
FIG_7    FIG_8

METHOD AND APPARATUS FOR CONTROLLING THE LOAD PLACED ON A COMPRESSOR

BACKGROUND OF THE INVENTION

The present invention relates to a method and apparatus for controlling the load placed on a compressor and, more particularly, the load placed on a compressor used with a refrigerated cabinet.

Refrigerated cabinets and the refrigeration systems which cool such refrigerated cabinets experience variable load conditions. The variable load conditions may occur due to a temperature increase of the contents of the refrigerator, such as when warm objects are placed in the refrigerator. Further, changes in the temperature of the ambient environment or frequency and duration at which users access the refrigerated cabinet will also vary the cooling load placed on the refrigeration system.

Refrigerated cabinets, as may be found in grocery stores or used as vending machines for cooled products, may employ a Complete Refrigeration System ("CRS") that is constructed as a module and provides the refrigeration system for cooling the cabinet. The CRS modules can be readily installed and removed from a refrigerated cabinet whereby such modules are interchangeable and easily serviced.

Typically, the compressor used with a refrigerated cabinet, such as in a CRS installed in the cabinet, is selected to have a capacity that is sufficient meet the expected peak cooling load of the refrigerated cabinet. For example, vending machines must often cool products from an ambient temperature to a predetermined storage temperature within a predetermined time period. The initial cooling load generated by loading a vending machine with ambient temperature products can be relatively significant. Oftentimes, the compressor for such vending machines is selected on the basis of whether the maximum rated capacity of the compressor is sufficient to meet the maximum load that such a vending machine would experience when it is fully loaded with ambient temperature products. When the compressor is selected on this basis, the compressor will often be larger than necessary for the loading conditions most frequently experienced by the vending machine and the efficiency of the compressor will be less than optimal.

SUMMARY OF THE INVENTION

The present invention provides a method and apparatus for controlling the load placed on a compressor by limiting the load placed on one of the heat exchangers, e.g., the evaporator of a cooling application, of the system to thereby limit the load on the compressor. The present invention allows a compressor to be used in applications wherein the maximum anticipated load of the application exceeds the nominal capacity of the compressor. For example, in a refrigeration system used to cool products in a refrigerator or vending machine, the peak loads placed on the evaporator may be limited to avoid exceeding the capacity of the compressor. As described in greater detail below, this may have only a negligible impact on the time required to cool products placed in such a refrigerated cabinet while significantly improving the efficiency of the system.

The invention comprises, in one form thereof, a method of operating a vapor compression system wherein the vapor compression system defines a closed fluid circuit in which a refrigerant is circulated and has operably disposed therein, in serial order, a compressor, a high pressure heat exchanger, an expansion device and a low pressure heat exchanger. The method includes operating the system wherein a variable thermal load is placed on a first one of the heat exchangers, monitoring the thermal load placed on the first heat exchanger and controlling the operation of the system to limit the thermal load placed on the first heat exchanger when the thermal load exceeds a first predetermined value.

Oftentimes, and particularly for transcritical cycles, the first heat exchanger will be the low pressure heat exchanger when used in a cooling application and the first heat exchanger will be the high pressure heat exchanger when used in a heating application. The thermal load placed on the first heat exchanger may be monitored in a number of different ways. For example, such monitoring may involve obtaining first and second values indicative of the temperature of the refrigerant at first and second locations in the fluid circuit. Or, it may involve obtaining a first value indicative of the temperature of a heat exchange medium or the ambient environment and obtaining a second value indicative of an operating parameter of the vapor compression system. Alternatively, an electrical motor may be used to drive the compressor and monitoring the thermal load of the first heat exchanger includes monitoring the electrical current powering the electrical motor.

Controlling the operation of the system to limit the thermal load placed on the first heat exchanger can include controlling the interaction of a heat exchanger medium with the first heat exchanger and may be accomplished in a number of different ways. For example, the heat exchange medium may be air conveyed by a passageway in communication with the first heat exchanger wherein the cross sectional area of the passageway is controlled. Alternatively, air may be selectively recirculated through a passageway in communication with the first heat exchanger to control the load placed on the first heat exchanger. Or, when the heat exchange medium is air, controlling the interaction of the air with the first heat exchanger may include controlling the operation of an air moving device such as by controlling its operational speed or by controlling the direction at which air is directed by the air moving device.

The invention comprises, in another form thereof, a method of operating a vapor compression system wherein the vapor compression system defines a closed fluid circuit in which a refrigerant is circulated and has operably disposed therein, in serial order, a compressor, a high pressure heat exchanger, an expansion device and a low pressure heat exchanger. The method includes coupling the vapor compression system with an application wherein a heat exchange medium is communicated between the application and the system, exchanging thermal energy between the heat exchange medium and a first one of the heat exchangers wherein a variable thermal load is placed on the first heat exchanger by the heat exchange medium during operation of the system, and controlling the operation of the system to limit the thermal load placed on the first heat exchanger when the thermal load exceeds a predetermined value.

The invention comprises, in yet another form thereof, a vapor compression system for use with a refrigerant. The system includes a closed fluid circuit in which the refrigerant is circulated, the fluid circuit having operably disposed therein, in serial order, a compressor, a high pressure heat exchanger, an expansion device, and a low pressure heat exchanger. The system also includes at least one sensing device operably coupled with the system measuring a value indicative of a variable thermal load placed on a first one of the heat exchangers and a heat exchange subsystem limiting the thermal load placed on the first heat exchanger when the variable thermal load exceeds a predetermined value.

One aspect of the present invention is that, for a given application, it allows for the use of a compressor having a relatively small capacity. This, in turn, provides several advantages. For example, a smaller capacity compressor is generally less costly than a similar compressor having a greater capacity. Limiting the load placed on the vapor compression system and employing a relatively smaller capacity compressor will also allow the compressor, heat exchangers and other aspects of the vapor compression system, e.g., a CRS, to have a smaller size thereby facilitating its use in a greater variety of applications.

Additionally, by limiting the load experienced by the system, the total charge of the refrigerant used in the system may be reduced. This may be particularly advantageous when employing a hydrocarbon refrigerant which are subject to limitations on the amount of charge that can be used in a refrigeration system.

BRIEF DESCRIPTION OF THE DRAWINGS

The above-mentioned and other features and objects of this invention will become more apparent and the invention itself will be better understood by reference to the following description of embodiments of the invention taken in conjunction with the accompanying drawings, wherein:

FIG. 4 is a graph depicting the cooling of a vending machine;

FIG. 5 is a schematic representation of heat exchange subsystem;

FIG. 6 is a schematic representation of alternative heat exchange subsystem;

FIG. 7 is a schematic representation of another heat exchange subsystem;

FIG. 8 is a schematic representation of the heat exchange subsystem of FIG. 7; and FIG. 9 is a schematic representation of a vapor compression system including sensing devices used to monitor a thermal load being placed on the system.

Figure 1:
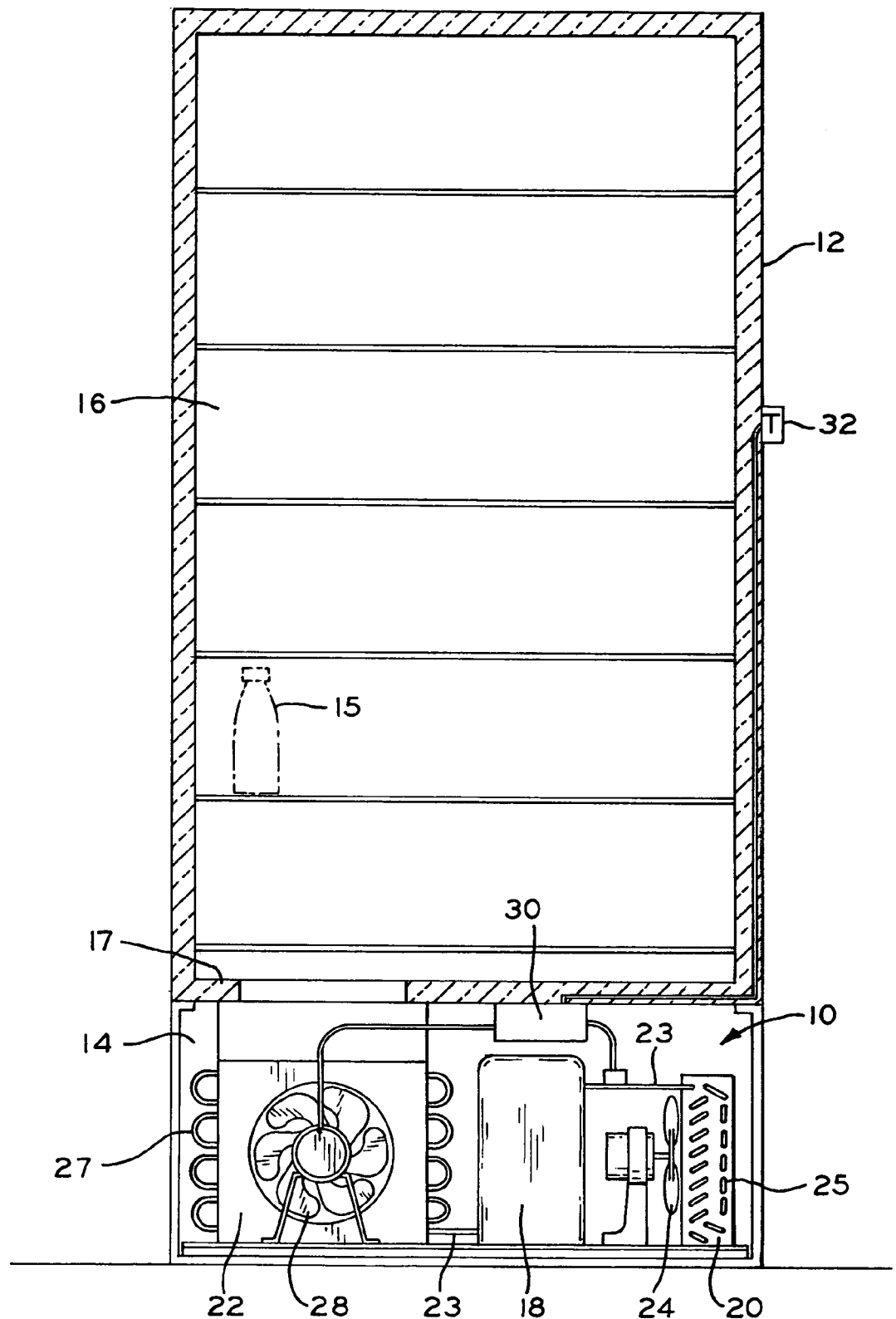
FIG. 1 is a sectional view of a vending machine in accordance with the present invention.

Corresponding reference characters indicate corresponding parts throughout the views. Although the drawings represent embodiments of the present invention, the drawings are not necessarily to scale and certain features may be exaggerated in order to better illustrate and explain the present invention. The exemplifications set out herein illustrate embodiments of the invention and such exemplifications are not to be construed as limiting the scope of the invention in any manner.

DETAILED DESCRIPTION OF THE INVENTION

Figure 2:
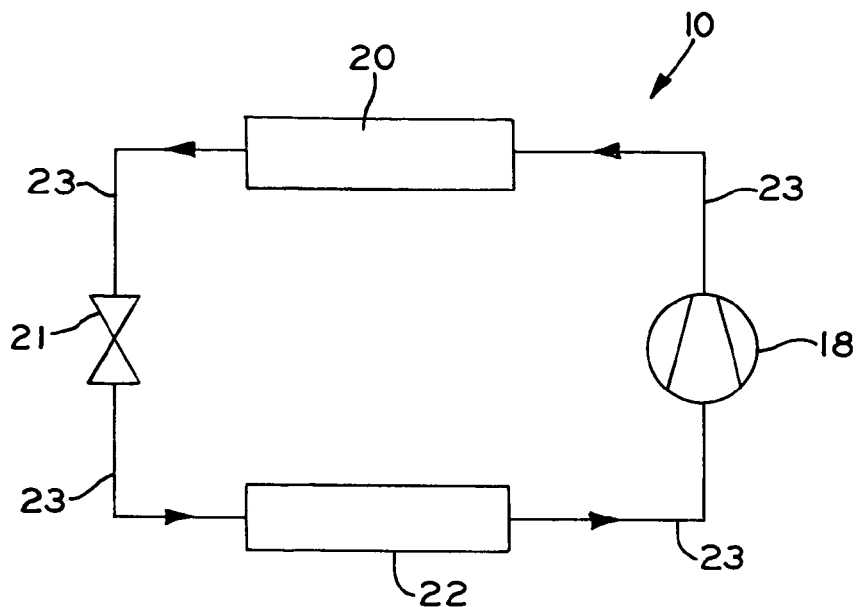
FIG. 2 is a schematic representation of a vapor compression system.

A vapor compression system 10 in accordance with the present invention is shown in FIGS. 1 and 2. In the illustrated embodiment, system 10 is used with a refrigerated cabinet 12 that may function as a refrigerator or vending machine. The illustrated cabinet 12 includes an equipment compartment 14 and a refrigerated compartment 16 separated by partition wall 17. Compartment 14 houses vapor compression system 10 and compartment 16 is used to store objects being cooled such as beverage containers 15 or perishable food products. As best seen in the schematic illustration of FIG. 2, vapor compression system 10 defines a closed fluid circuit in which a refrigerant is circulated and includes, in serial order, a compressor 18, a high pressure heat exchanger 20, an expansion device 21, and a low pressure heat exchanger 22. Conduits 23 provide fluid communication between the various components of system 10.

In general operation, refrigerant vapor enters compressor 18 at a relatively low suction pressure. Compressor 18 compresses and discharges the refrigerant vapor at a higher discharge pressure. The compression of the refrigerant vapor also increases the temperature of the refrigerant vapor. After being discharged from compressor 18, the high pressure refrigerant enters high pressure heat exchanger 20. In the illustrated embodiment, the vapor compression system 10 is a conventional subcritical system wherein the discharged refrigerant is at a subcritical pressure and high pressure heat exchanger 20 is commonly referred to as a condenser. The present invention, however, may also be used in transcritical systems, such as those using carbon dioxide as a refrigerant, wherein the refrigerant is discharged from the compressor at a supercritical pressure. In such transcritical systems, the high pressure heat exchanger is commonly referred to as a gas cooler instead of a condenser. Heat exchanger 20 includes an air moving device in the form of fan 24 mounted adjacent to the coils 25 of the heat exchanger 20. Fan 24 blows ambient air across the coils of heat exchanger 20 to cool the refrigerant within the coils 25 and thereby condense the high pressure refrigerant into a liquid state. Compartment 14 of cabinet 12 is provided with vent openings to allow for the ingress and egress of the ambient air being forced across the coils of heat exchanger 20 by fan 24.

After exiting heat exchanger 20, the refrigerant passes through expansion device 21 to thereby reduce the pressure of the refrigerant. The reduced pressure refrigerant then enters low pressure heat exchanger 22 where it is converted to a gaseous state. Such low pressure heat exchangers are commonly referred to as evaporators. As the refrigerant changes phase it absorbs thermal energy and cools the air passing through the coils 27 of evaporator 22. An air moving device in the form of a fan 28 is mounted adjacent coils 27 of evaporator 22 to move air through evaporator 22. The operation of evaporator 22 is discussed in greater detail below.

Typically, refrigerated cabinets are designed such that the vapor compression system utilized with the cabinet has a compressor that has a maximum rated capacity that is adequate to meet the anticipated maximum load that the refrigerated cabinet will place on the evaporator. In refrigerated cabinets that function as vending machines such as a vending machine for dispensing cooled beverage containers, the maximum anticipated load will generally correspond to the load that is created by entirely filling the cabinet with "warm" product, i.e., beverage containers at ambient or room temperature. Typically, vending machines are required to be capable of cooling all of the beverage containers to a design temperature within a predefined period of time after the vending machine has been fully loaded with warm product.

The cooling load that is generated by such a vending machine will depend upon a number of factors including the warm product temperature, the desired cooled product temperature, the number of products that the vending machine will hold and also the thermal characteristics of the product itself. Different products cool at different rates. The Biot number of an object describes the cooling of that object by convection. The Biot number is a dimensionless characteristic that is dependent upon the heat transfer coefficient governing convective cooling of the object, the thermal conductivity coefficient and the characteristic dimension of the object. In other words, the Biot number of an object is dependent upon its material and shape. When the Biot number of an object is small, e.g., considerably less than 1, the cooling of the object will generally be limited by the convective boundary conditions and the temperature gradients within the object will be small. Such a situation will result when the material has a high thermal conductivity and convective cooling is relatively weak. When an object has a higher Biot number, e.g., greater than 1, the temperature gradient within the object will be larger and the internal transfer of thermal energy within the object may limit the cooling of the object. Such a situation may result when the material of the object has a low conductivity and the convective cooling of the object is relatively strong.

Figure 3:
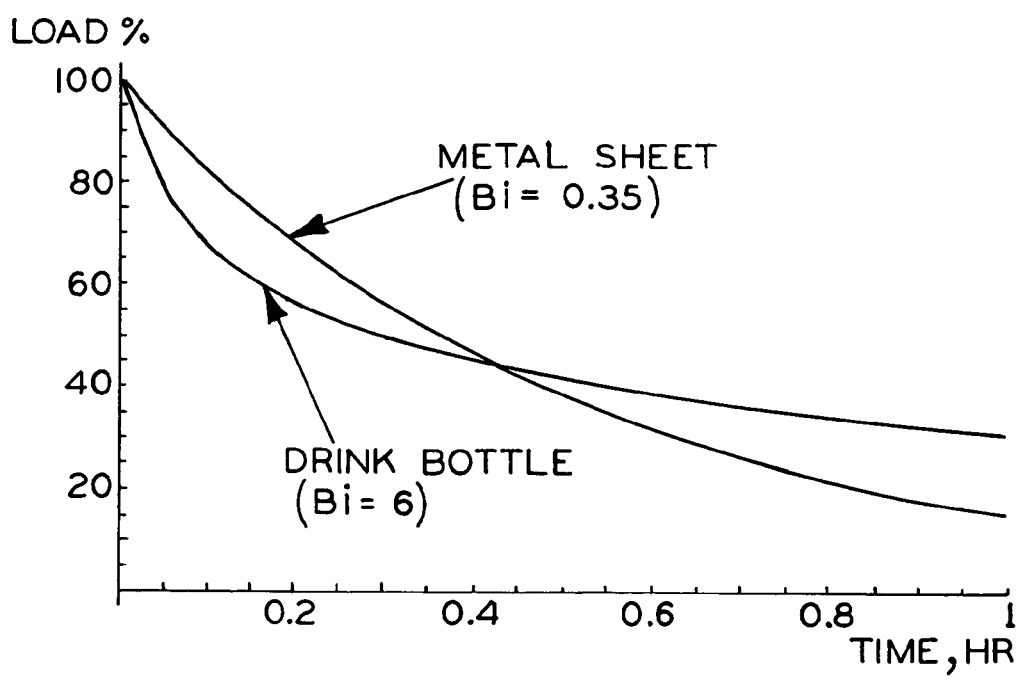
FIG. 3 is a graph depicting the cooling of two objects having different Biot numbers.

FIG. 3 illustrates the cooling of two separate objects having different Biot numbers. The first object is a metal sheet having a Biot number of 0.35. As shown in FIG. 3, the metal sheet generates a cooling load that decreases at a fairly constant and nearly linear rate over time. The second object is a drink bottle having a Biot number of 6. As shown in FIG. 3, the drink bottle produces a cooling load that decreases at a very rapid rate as it first begins cooling and then begins to cool at a much slower rate. For example, plastic beverage bottles cool quickly initially, releasing a large amount of heat, but then cool more slowly.

FIG. 4 schematically represents the maximum anticipated load for a vending machine which has a cooling curve shaped similar to that of the drink bottle depicted in FIG. 3. FIG. 4 is used to schematically and graphically represent the concepts discussed herein to clarify such concepts but is not necessarily drawn to scale. Generally, the vapor compression system, also referred to as the refrigeration system, of such a vending machine would be designed to have a peak rated capacity that was adequate to address anticipated peak load 60. The product will be at its desired temperature at end point 64b. A compressor having a capacity rated for peak load 60 will typically have a maximum efficiency at a load that is above the generally horizontal portion of the cooling load curve. For example, such a compressor may have a maximum efficiency at a load that corresponds the load represented by dashed line 62. For such a compressor, the compressor will operate at a high efficiency near line 62, e.g., from approximately point 62a to point 62b during the cooling process, but the majority of the cooling required to chill the drink bottles will take place at a load where the compressor operates at a relatively low efficiency.

By selecting a compressor having a maximum efficiency that corresponds to the load represented by dashed line 64 in FIG. 4, the compressor will be operated a higher efficiency for a longer period of time during the cooling of a load of warm product. As schematically depicted in FIG. 4, this smaller capacity compressor will be able to operate at relatively high efficiency from point 64a to point 64b. Such a compressor will also be likely to operate at a more efficient level when maintaining the product at the desired product temperature during the time between filling of the vending machine. Such a compressor, however, may not have a capacity that is adequate to address the anticipated peak load 60. For example, the maximum rated capacity of such a compressor may correspond to a point 67 above line 66 of FIG. 4.

The present invention enables the use of such a smaller compressor in the vending machine by limiting the load placed on the vapor compression system when the load exceeds a predetermined value, e.g., line 66 in FIG. 4. By limiting the load placed on the system, the initial cooling of the product may take longer. For example, with reference to FIG. 4, by limiting the maximum load when it exceeds the value of line 66, the time it takes to cool product from point 60 to point 66a will likely take slightly longer than if the load was not so limited. However, after reaching point 66a, the time for cooling the product will no longer be limited by the capacity of the compressor. Because the time period from point 60 to point 66a is relatively short in comparison to the total time that it takes to cool the product to the desired end point 64b, the limiting of the maximum load in this initial cool down period will not have a significant impact on the total time required to cool the product while providing significant improvement in the efficiency of the system.

Limiting the thermal load placed on vapor compression system 10 and enabling the use of a smaller compressor, can not only improve the efficiency of the system, but may also reduce the cost of the compressor and, potentially, the system as a whole. The limiting of the thermal load may also reduce the total refrigerant charge required by the system and thereby facilitate the use of hydrocarbon refrigerant which are often subject to limitations on the total refrigerant charge that may be used in a system. The ability to limit the thermal load of a vending machine or similar refrigerated cabinet also provides benefits when using CRS modules. Such modules may be removed from a refrigerated cabinet for servicing or repair and replaced by another CRS module. By having the ability to limit the thermal load placed on such a module, the refrigerated cabinet will be able to accept CRS modules that might otherwise not have an adequate capacity for the cabinet.

The limiting of the load placed on system 10 will now be discussed with reference to FIGS. 5–8. In the illustrated embodiment, vapor compression system 10 is used to cool a refrigerated cabinet. Air from cabinet interior 16 is passed through evaporator 22 to cool the air and the air is then returned to cabinet interior 16 where it cools the products located therein. Consequently, the load on system 10 is determined by the thermal load placed on evaporator 22 by the heat exchange medium, i.e., air from cabinet interior 16. By limiting the thermal load placed on evaporator 22, the load on system 10 and compressor 18 can thereby also be limited. Alternative embodiments of the present invention may utilize different heat exchanger mediums and/or place the pertinent thermal load on the high pressure heat exchanger. For example, in a water heater application, the thermal load placed on the system may be determined by water that is in thermal communication with the high pressure heat exchanger.

FIG. 5 illustrates one embodiment of a heat exchange subsystem 70 that may be used with the present invention. In the embodiment of FIG. 5, evaporator 22 and fan 28 are positioned within housing 26. Air from cabinet interior 16 is drawn into the passageway 29 defined by housing 26 through inlet 35 by the action of fan 28. The air is then forced through evaporator 22 where it is cooled and then returns to cabinet interior 16 through outlet 36. When the thermal load placed on evaporator 22 exceeds a predetermined value, the load may be reduced by restricting the cross sectional area of inlet 35 of passageway 29. The cross sectional area of inlet 35 is controlled by an adjustable restriction member 38. Member 38 may take the form of an electronically controlled baffle member and, in alternative embodiments, instead of being located at the inlet 35 of passageway 29, the restrictor member or other form of baffle for controlling the cross sectional area of passageway 29 may be located at an intermediate location in passageway 29 either upstream or downstream of evaporator 22 or at the outlet 36 of passageway 29.

FIG. 6 illustrates another embodiment 70a of a heat exchange subsystem that may be used with the present invention. In this embodiment, housing 26a defines a bypass channel 40 having an inlet 41 located downstream of evaporator 22 and an outlet 42 located upstream of evaporator 22. A restrictor member 38a which may also be an electronically controlled baffle member controls the air flow into inlet 41 of bypass channel 40. To limit the thermal load placed on evaporator 22, restrictor member 38a is moved to a position where inlet 41 is open and air enters bypass channel 40 after passing through evaporator 22. The air in bypass channel 40 is then returned to passageway 29 upstream of evaporator 22 where it acts to reduce the average temperature of the air stream flowing across evaporator 22 and thereby reduce the thermal load being placed on evaporator 22.

FIGS. 7 and 8 illustrate another embodiment 70b of a heat exchange subsystem that may be employed with the present invention. In this embodiment, housing 26b defines a recirculation channel 46. Channel 46 has an inlet 47 in fluid communication with passageway 29 at a location between inlet 35 and evaporator 22 and an outlet 48 that is in fluid communication with passageway 29 between inlet 35 and inlet 47. Fan 28a is repositionable, and to limit the thermal load placed on evaporator 22, the position of fan 28a is moved from that depicted in FIG. 7 to the position shown in FIG. 8. Motor assembly 19a includes an electronically controlled servo motor to move the position of fan 28a, however, other means of moving the position of fan 28a may also be employed. Arrows 49 represent the direction in which air is moved by fan 28a in these different positions. When fan 28a is in the position shown in FIG. 7, fan 28a moves air in a first direction substantially perpendicular to the lengthwise direction of the coils of evaporator 22 and which maximizes the flow of air through evaporator 22. When fan 28a is moved into the position shown in FIG. 8, fan 28a moves air in a second direction that is directed towards inlet 47 of recirculation channel 46. When fan 28a is in this second position, a greater quantity of air is directed through channel 46 and the air flow through evaporator 22 is reduced thereby reducing the thermal load placed on evaporator 22.

The air moving device 28, 28a used with the embodiments shown in FIGS. 5–8 may be a variable speed device wherein varying the operating speed of the device varies the flow rate of the air moved by the device. For example, using variable speed fans 28, 28a allows the fan blade speed to be varied to reduce the mass flow rate of air through evaporator 22. The adjustment of the operating speed of fan 28, 28a, by itself, in the embodiments of FIGS. 5–8 is capable of altering the thermal load being placed on evaporator 22. For example, if the embodiment depicted in FIG. 5 did not include restrictor 38, the operating speed of fan 28 could be reduced to thereby limit the thermal load placed on evaporator 22. Alternatively, by combining a variable speed fan with the embodiments of FIGS. 5–8, the operating speed of the fan can be controlled (e.g., reducing the operating speed) to supplement the thermal load limiting effects of restrictor 38, bypass channel 40 and recirculation channel 46 described above.

Monitoring the thermal load being placed on one of the high or low pressure heat exchangers of the system to determine when it has exceeded a predefined value and should be limited can be accomplished in a number of different ways. In the illustrated embodiments, it is the thermal load on evaporator 22 that is monitored and system 10 includes a controller 30 which is in communication with one or more sensing devices to enable controller 30 to monitor the load. FIG. 9 schematically depicts system 10, including a heat exchange subsystem 70, controller 30 and various sensing devices 32a–32j, not all of would be used in a single system.

One of the primary objectives of limiting the thermal load being placed on evaporator 22 is to prevent the overloading of compressor 18. Consequently, an effective way of indirectly monitoring the load placed on evaporator 22 is to monitor the electrical current required to power compressor 18 using a sensing device 32a in communication with controller 30. When the current supplied to compressor 18 exceeds a predetermined value, the heat exchange subsystem is controlled to reduce the load being placed on evaporator 22. For example line 31 extending from controller 30 could be in communication with restrictor 38 to control the position of restrictor 38, with fan 28 to control the operating speed of the fan, or with another device, such as those discussed in greater detail above, capable of limiting the thermal load being placed on evaporator 22. Controller 30 may also be programmed so that it varies its response as the current supplied to compressor 18 varies. For example, the controller 30 could be programmed to move restrictor 38 to vary the cross sectional area of inlet 35 wherein the open area of inlet 35 is progressively diminished as the current supplied to compressor 18 progressively increases beyond a predefined value. In other embodiments, the controller may also be programmed to reduce the operational speed of fan 28 when the current to compressor 18 exceeds a predefined value. The reduction of the operating speed of fan 28 may be to a single predefined lower operating speed or be a stepwise reduction which progressively lowers the speed of fan 28 as the current to compressor 18 progressively increases beyond the predefined value.

Even when employing a fan or other air moving device that has only a single operating speed, controller 30 may be programmed to deactivate the air moving device when the current supplied to compressor 18. For example, restrictor 38 may be employed to progressively restrict inlet 35 after the current supplied to compressor 18 reaches and then exceeds a first predefined value and, if the current supplied to compressor 18 reaches a second, higher predefined value, controller 30 could control fan 28 by deactivating it.

With reference to FIG. 4, a first predefined value of the current supplied to compressor 18 could correspond to line 66. When this value is exceeded, the thermal load being placed on evaporator 22 would begin to be limited. The current value selected to define line 66 may be advantageously selected below the maximum current level of compressor 18, i.e., a value corresponding to point 67 in FIG. 4, to allow for the thermal load to continue to increase slightly after beginning to limit the thermal load. In other words, although the thermal load is being limited, it is possible that the rate of increase in the thermal load exceeds the rate of limitation on the thermal load. The controller may be programmed to shut the system down if the limiting of the thermal load fails to prevent the thermal load from exceeding point 67.

Other sensors depicted in FIG. 9 that may be used to monitor a thermal load being placed on system 10 either directly or indirectly include sensors 32a–32j which may be used in various combinations to monitor the thermal load being placed on system 10. Persons having ordinary skill in the art are familiar with the use of sensing devices to monitor the operation of a vapor compression system and the thermal load being placed thereon and sensing devices 32b–32j schematically depicted in FIG. 9 may be used in various combinations to monitor the thermal load being placed on system 10 as is known in the art.

For example, sensors 32b and 32c may be used together to monitor the thermal load placed on heat exchanger 22 or may be used in combination with additional sensing devices. Sensor 32b is used to measure the air temperature within compartment 16 of cabinet 12, alternatively, sensor 32b could be located in housing 32 shown in FIG. 1 and measure the external air temperature. Sensor 32c measures the temperature of the heat exchange medium, i.e., air, after it has been cooled by evaporator 22.

Sensors 32e and 32f which respectively measure the temperature and/or pressure of the refrigerant at the inlet and outlet of compressor 18 may also be used to indirectly monitor the thermal load being placed on evaporator 22. Alternatively, sensors 32g and 32h which respectively measure the temperature of the refrigerant at the inlet and outlet of the high pressure heat exchanger 20 can be used to indirectly monitor the thermal load on heat exchanger 22. Sensors 32i and 32j which respectively measure the temperature of the refrigerant at the inlet and outlet of the low pressure heat exchanger 22 may also be used to monitor the load on heat exchanger 22. As is known in the art, it is also possible to measure various other system operating parameters, e.g., the pressure of the refrigerant within the high pressure heat exchanger in a transcritical system, when determining the load being placed on one of the heat exchangers in the system.

For example, when employing sensors 32c and 32d to measure the temperature of the air after it has passed through evaporator 22 and the temperature of the refrigerant within evaporator 22 the differential between the two temperatures may be used to provide a value indicative of the thermal load being placed on the evaporator. Sensors 32c and 32d may be employed with heat exchange subsystem 70a wherein air is recirculated through bypass channel 40 to reduce the thermal load placed on evaporator 22 when the temperature differential measured by sensors 32c and 32d exceeds a predetermined value.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A method of operating a vapor compression system, the vapor compression system defining a closed fluid circuit in which a refrigerant is circulated and having operably disposed therein, in serial order, a compressor, a high pressure heat exchanger, an expansion device and a low pressure heat exchanger, said method comprising:
    applying a variable thermal load on a first one of the heat exchangers;
    monitoring the thermal load placed on the first heat exchanger; and
    controlling the operation of the system to limit the thermal load placed on the first heat exchanger when the thermal load exceeds a predetermined value, wherein controlling the operation of the system comprises controlling the interaction of a heat exchange medium with the first heat exchanger, wherein the heat exchange medium is air and controlling the interaction of the air with the first heat exchanger comprises controlling the operation of an air moving device in communication with the first heat exchanger, wherein controlling the operation of the air moving device comprises controlling the direction at which air is moved by the air moving device.

2. The method of claim 1 wherein monitoring the thermal load of the first heat exchanger comprises obtaining a first value indicative of the temperature of the refrigerant at a first location in the fluid circuit and obtaining a second value indicative of the temperature of the refrigerant at a second location in the fluid circuit.

3. The method of claim 2 wherein the first location is proximate an inlet to the low pressure heat exchanger and the second location is proximate an outlet of the low pressure heat exchanger.

4. The method of claim 2 wherein the first location is proximate an inlet to the high pressure heat exchanger and the second location is proximate an outlet of the high pressure heat exchanger.

5. The method of claim 2 wherein the first location is proximate an inlet to the compressor and the second location is proximate an outlet of the compressor.

6. The method of claim 1 wherein monitoring the thermal load of the first heat exchanger comprises obtaining a first value indicative of the temperature of a the heat exchange medium in thermal communication with the first heat exchanger and obtaining a second value indicative of an operating parameter of the vapor compression system.

7. The method of claim 6 wherein said first heat exchanger is the low pressure heat exchanger and said second temperature is the discharge temperature of air cooled by the first heat exchanger.

8. The method of claim 1 wherein an electrical motor drives the compressor and monitoring the thermal load of the first heat exchanger comprises monitoring the electrical current powering the electrical motor.

9. The method of claim 1 wherein said air is conveyed by a passageway in communication with the first heat exchanger and controlling the interaction of the air with the first heat exchanger comprises controlling the cross sectional area of the passageway.

10. The method of claim 1 wherein said air is conveyed by a passageway in communication with the first heat exchanger and controlling the interaction of the air with the first heat exchanger comprises selectively recirculating air in the passageway.

11. The method of claim 1 wherein controlling the operation of the air moving device comprises controlling the operating speed of the air moving device.

12. A method of operating a vapor compression system, the vapor compression system defining a closed fluid circuit in which a refrigerant is circulated and having operably disposed therein, in serial order, a compressor, a high pressure heat exchanger, an expansion device and a low pressure heat exchanger, said method comprising:
    coupling the vapor compression system with an application wherein a heat exchange medium is communicated between the application and the system;
    exchanging thermal energy between the heat exchange medium and a first one of the heat exchangers, wherein a variable thermal load is placed on the first heat exchanger by the heat exchange medium during operation of the system; and controlling the operation of the system to limit the thermal load placed on the first heat exchanger when the thermal load exceeds a predetermined value, wherein the application is a refrigerated cabinet, wherein the first heat exchanger is the low pressure heat exchanger and the heat exchange medium is air that is cooled by the first heat exchanger, wherein controlling the operation of the system comprises controlling the passage of air over the first heat exchanger, wherein controlling the passage of air over the first heat exchanger comprises controlling the operation of an air moving device forcing the passage of air over the first heat exchanger, and wherein controlling the operation of the air moving device comprises controlling the direction at which air is directed by the air moving device.

13. The method of claim 12 wherein controlling the passage of air over the first heat exchanger comprises controlling the area of a passageway through which flows the air passing over the first heat exchanger.

14. The method of claim 12 wherein controlling the passage of air over the first heat exchanger comprises selectively recirculating air within a passage in communication with the first heat exchanger.

15. The method of claim 12 wherein controlling the operation of the air moving device comprises controlling the operating speed of the air moving device.

16. The method of claim 12 wherein an electrical motor drives the compressor and monitoring the thermal load of the first heat exchanger comprises monitoring the electrical current powering the electrical motor.

17. The method of claim 12 wherein monitoring the thermal load of the first heat exchanger comprises obtaining a first value indicative of the temperature of the ambient environment and obtaining a second value indicative of an operating parameter of the vapor compression system.

18. The method of claim 12 wherein monitoring the thermal load of the first heat exchanger comprises obtaining a first value indicative of the temperature of the refrigerant at a first location in the fluid circuit and obtaining a second value indicative of the temperature of the refrigerant at a second location in the fluid circuit.

19. A vapor compression system for use with a refrigerant, said system comprising:
a closed fluid circuit in which the refrigerant is circulated, the fluid circuit having operably disposed therein, in serial order, a compressor, a high pressure heat exchanger, an expansion device, and a low pressure heat exchanger;
at least one sensing device operably coupled with said system measuring a value indicative of a variable thermal load placed on a first one of said heat exchangers;
a heat exchange subsystem limiting the thermal load placed on the first heat exchanger when the variable thermal load exceeds a predetermined value;
a cabinet having an interior volume; and
a first air passage providing communication between said first heat exchanger and said interior volume of said cabinet, the first heat exchanger being the low pressure heat exchanger, wherein said heat exchange subsystem controls the flow of air through said first air passage, wherein said heat exchange subsystem further comprises a second passage in communication with said first air passage at first and second locations wherein air is recirculatable through said first air passage through said second passage, wherein said first location is downstream of said first heat exchanger and said second location is upstream of said first heat exchanger and air is recirculatable through said first heat exchanger.

20. The vapor compression system of claim 19 wherein said at least one sensing device comprises a first temperature sensor positioned at a first location in said fluid circuit and a second temperature sensor positioned at a second location in said fluid circuit.

21. The vapor compression system of claim 19 wherein said at least one sensing device comprises a first temperature sensor positioned to measure an ambient temperature and a second temperature sensor positioned to measure a temperature indicative of an operating parameter of the vapor compression system.

22. The vapor compression system of claim 19 further comprising an electrical motor coupled to said compressor and driving said compressor and wherein said at least one sensing device senses the electrical current powering said electrical motor.

23. The vapor compression system of claim 19 wherein said system is a modular assembly removably couplable to an application.

24. The vapor compression system of claim 19 wherein heat exchange subsystem comprises an adjustable restriction member, adjustment of said restriction member varying the cross sectional area of said air passage.

25. A vapor compression system for use with a refrigerant, said system comprising:
a closed fluid circuit in which the refrigerant is circulated, the fluid circuit having operably disposed therein, in serial order, a compressor, a high pressure heat exchanger, an expansion device, and a low pressure heat exchanger;
at least one sensing device operably coupled with said system measuring a value indicative of a variable thermal load placed on a first one of said heat exchangers;
a heat exchange subsystem limiting the thermal load placed on the first heat exchanger when the variable thermal load exceeds a predetermined value;
a cabinet having an interior volume; and an air passage providing communication between said first heat exchanger and said interior volume of said cabinet, the first heat exchanger being the low pressure heat exchanger,
wherein said heat exchange subsystem comprises an air moving device forcing the passage of air over said first heat exchanger and wherein the variable operation of said air moving device controls the flow of air through said air passage,
the vapor compression system further comprising a mechanism selectively adjusting an air flow direction defined by said air moving device.

26. The vapor compression system of claim 25 wherein said air moving device has a variable operating speed and varying said operating speed varies the flow rate of air through said air passage.

* * * * *

UNITED STATES PATENT AND TRADEMARK OFFICE
CERTIFICATE OF CORRECTION

| | | |
|---|---|---|
| PATENT NO. | : 7,159,409 B2 | Page 1 of 1 |
| APPLICATION NO. | : 10/790267 | |
| DATED | : January 9, 2007 | |
| INVENTOR(S) | : Dan M. Manole | |

It is certified that error appears in the above-identified patent and that said Letters Patent is hereby corrected as shown below:

Claim 6, Column 10, Line 31, delete "a"

Signed and Sealed this

Tenth Day of April, 2007

JON W. DUDAS
*Director of the United States Patent and Trademark Office*